(12) United States Patent
Kosugi et al.

(10) Patent No.: US 8,197,960 B2
(45) Date of Patent: Jun. 12, 2012

(54) BATTERY MODULE

(75) Inventors: Shinichiro Kosugi, Kanagawa-ken (JP); Bruce Falls, Lake Forest, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 430 days.

(21) Appl. No.: 12/606,521

(22) Filed: Oct. 27, 2009

(65) Prior Publication Data

US 2010/0112433 A1 May 6, 2010

(30) Foreign Application Priority Data

Oct. 30, 2008 (JP) ................ P2008-280402

(51) Int. Cl.
*H01M 6/42* (2006.01)
*H01M 6/46* (2006.01)

(52) U.S. Cl. ........ 429/154; 429/149; 429/152; 429/153; 429/155; 429/151

(58) Field of Classification Search .................. None
See application file for complete search history.

(56) References Cited

U.S. PATENT DOCUMENTS

| | | | | |
|---|---|---|---|---|
| 3,784,411 A * | 1/1974 | Ciliberti, Jr. | .................. | 429/157 |
| 4,107,402 A * | 8/1978 | Dougherty et al. | ........... | 429/120 |
| 5,879,833 A * | 3/1999 | Yoshii et al. | .................. | 429/62 |
| 6,465,123 B1 * | 10/2002 | Baumann et al. | ............... | 429/99 |
| 6,709,783 B2 * | 3/2004 | Ogata et al. | .................... | 429/120 |
| 6,761,992 B1 * | 7/2004 | Marukawa et al. | ............. | 429/96 |
| 2003/0211384 A1 * | 11/2003 | Hamada et al. | ............... | 429/120 |
| 2007/0037051 A1 * | 2/2007 | Kim et al. | ..................... | 429/151 |
| 2007/0178377 A1 * | 8/2007 | Kim et al. | ..................... | 429/152 |
| 2008/0090137 A1 * | 4/2008 | Buck et al. | .................... | 429/120 |
| 2008/0286647 A1 * | 11/2008 | Naito | ............................ | 429/149 |
| 2010/0015517 A1 * | 1/2010 | Fujita et al. | ................... | 429/149 |

FOREIGN PATENT DOCUMENTS

| | | |
|---|---|---|
| JP | 2009-87541 | 4/2009 |
| JP | 2009-87542 | 4/2009 |

\* cited by examiner

*Primary Examiner* — Krishnan S Menon
(74) *Attorney, Agent, or Firm* — Oblon, Spivak, McClelland, Maier & Neustadt, L.L.P.

(57) ABSTRACT

A battery module comprising: a plurality of battery cells of substantially rectangular parallelepiped shape; a first casing having a first holding section 42 that holds one end of the plurality of battery cells; a second casing having a second holding section 52 that holds the other end of the plurality of battery cells; and a plurality of insulating members arranged between the battery cells; wherein the battery cells are arranged lined up so that adjacent main walls thereof extending between the one ends and the other ends face each other and the plurality of insulating members are arranged in mutually separated fashion between the main walls.

9 Claims, 5 Drawing Sheets

BATTERY MODULE

CROSS-REFERENCE TO RELATED APPLICATION

This application claims benefit of priority from Japanese application number JP 2008-280402 filed Oct. 30, 2008, the entire contents of which are incorporated by reference herein.

BACKGROUND OF THE INVENTION

1. Field of the Invention

The present invention relates to a battery module and in particular relates to a battery module comprising a plurality of battery cells employing non-aqueous electrolyte, typified by for example lithium ion batteries.

2. Description of the Related Art

In recent years, non-aqueous secondary batteries, in particular, lithium ion secondary batteries, have attracted attention as for example power sources for cordless portable electronic equipment and, in addition, as power sources for driving vehicles, such as for example electric automobiles, on account of their high voltage and high energy density.

For example, as the power source for vehicle mounting that is employed in an electric automobile or an electric car, for improving versatility, a battery module may be constituted by connecting a plurality of battery cells in series or parallel, and installing a plurality of these battery modules in combination as a battery pack.

For example, Laid-open Japanese Patent Application No. Tokkai 2001-93484 (hereinbelow referred to as Patent Reference 1), discloses a secondary battery assembly in which a secondary battery is constituted by arranging in series a plurality of single cells, this plurality of series-arranged single cells being arranged in a cooling box, wherein coolant passages are formed between the inside wall surface of the cooling box and the side faces of the single cells and between the single cells.

Thus, in such a battery module having a plurality of single cells, it is necessary to fix the cells in order to prevent adjacent cells from coming into contact due to vibration etc.

Furthermore, when a plurality of battery cells are arranged next to each other as described in the above Patent Reference 1, the battery cells may swell up due to evolution of gas etc in the interior of the sealed cells during power generation, causing adjacent battery cells to come into contact. For reasons such as preventing penetration of water, the outer container of the battery cells is frequently formed of metal and this sometimes results in short-circuiting when adjacent battery cells come into contact. To prevent this, conventionally, insulation of the battery cells was effected by means such as covering the outer container of the battery cells with insulating material. An example is to be found in Laid-open Japanese Patent Application No. Tokkai 2003-197158 (hereinbelow referred to as Patent Reference 2).

However, when the surface of the outer container of the battery cells is covered with electrically insulating material, this electrically insulating material functions as a thermally insulating layer, making it necessary to provide powerful cooling means.

SUMMARY OF THE INVENTION

The present invention was made in view of the above circumstances, its object being to provide a battery module wherein insulation is effected between the battery cells without impeding cooling of the battery cells.

In order to achieve the above object, a battery module according to the present invention is constructed as follows. Specifically, a battery module according to the present invention comprises: a plurality of battery cells of substantially rectangular parallelepiped shape;

a first having comprising a first holding section that holds one end of said plurality of battery cells;

a second casing having a second holding section that holds the other end of said plurality of battery cells; and a plurality of insulating members arranged between aforementioned battery cells, wherein aforementioned battery cells are arranged lined up so that adjacent main walls thereof extending between aforementioned one ends and aforementioned other ends face each other and aforementioned plurality of insulating members are arranged in mutually separated fashion between aforementioned main walls.

With the present invention, a battery cell module can be provided wherein insulation is effected between the battery cells, without impeding cooling of the battery cells.

DETAILED DESCRIPTION OF THE PREFERRED EMBODIMENTS

Figure 1:
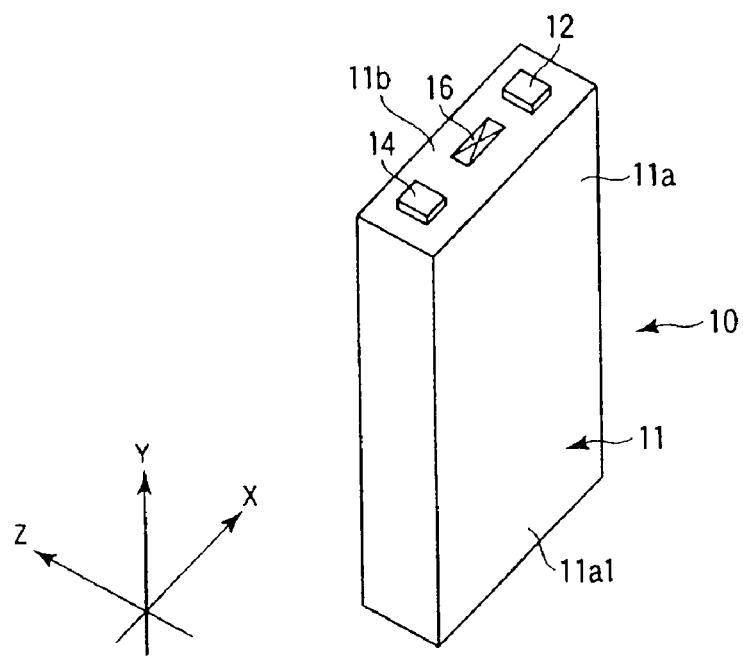
FIG. 1 is a perspective view given in explanation of a constructional example of a battery cell of a battery module according to an embodiment of the present invention.

A battery module according to an embodiment of the present invention is described below with reference to the drawings. FIG. 1 is a perspective view showing the external appearance of a sealed-type secondary battery. A battery module according to this embodiment comprises a plurality of sealed-type secondary batteries as shown in FIG. 1.

As shown in FIG. 1, the sealed-type secondary batteries are constituted as for example thin non-aqueous battery cells 10, such as lithium ion batteries. A battery cell 10 comprises a flat rectangular box-shaped external container 11 formed of for example aluminum and electrode bodies (not shown) accommodated in the external container 11 together with non-aqueous electrolyte.

The external container 11 is formed in gas-tight fashion and comprises a container main body 11a sealed at its other end and a lid 11b of rectangular plate shape that closes the aperture of the container main body, being welded to the container main body 11a. The container main body 11a comprises: a bottom wall facing the aperture; two mutually facing main walls 11a1 that extend between the aperture and the bottom wall; and two sidewalls that extend in the thickness direction (Z direction) between the two main walls 11a1.

The electrode assembly that is accommodated in the external container 11 is formed for example in flat rectangular shape by coiling a positive electrode plate and negative electrode plate in a spiral fashion, with a separator interposed therebetween, and, in addition, compressing in the radial direction.

A positive electrode terminal 12 and negative electrode terminal 14 are respectively provided at both ends in the longitudinal direction (X direction) of the lid 11b, and project from the lid 11b. The positive electrode terminal 12 and negative electrode terminal 14 are respectively electrically connected with the positive electrode and the negative electrode of the electrode assembly.

The positive electrode of the electrode assembly is electrically connected with the external container 11 and the positive electrode terminal 12 is electrically connected with the positive electrode through the external container 11. The negative electrode terminal 14 extends through the lid 11b. Gas-tight sealing and electrical insulation is effected between the positive electrode terminal 14 and external container 11 by the provision of a sealing member such as for example a gasket (not shown) made of insulator such as synthetic resin or glass between the negative electrode terminal 14 and lid 11b.

A pressure-release valve 16 is constituted by a plurality of lithographic marks formed in the middle of the lid 11b. The pressure-release valve 16 is constituted by making the lid 11b of locally reduced thickness.

Figure 2:
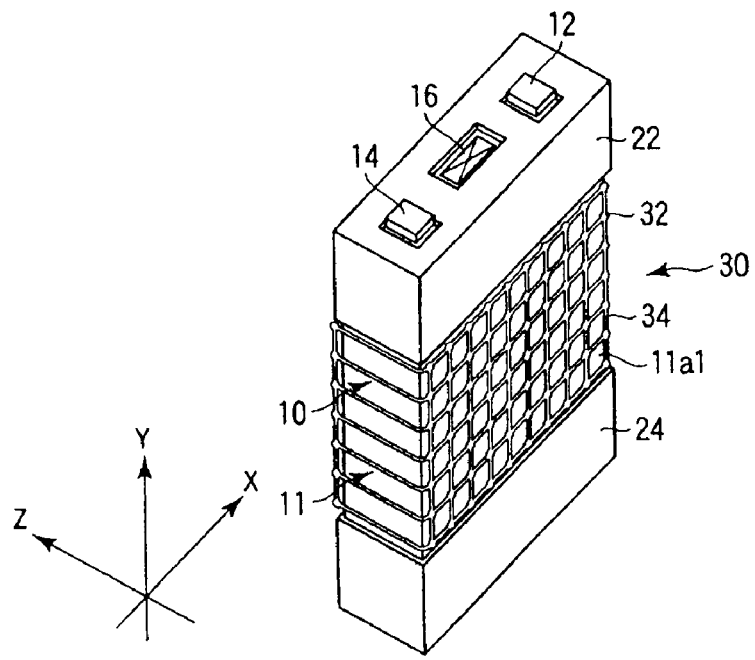
FIG. 2 is an exploded perspective view given in explanation of a constructional example of a battery cell whereon a resilient cover and insulating means are mounted.

As shown in FIG. 2, in the battery module according to the present embodiment, resilient covers are mounted at both ends in the height direction (Y direction) of the external container 11. A first resilient cover 22 is mounted at the end where the lid 11b (or lid body 11b) of the external container 11 is mounted. Apertures for exposing the positive electrode terminal 12, negative electrode terminal 14 and pressure release valve 16 are provided in the first resilient cover 22. A second resilient cover 24 is mounted at the end of the external containing 11 on the side (end section) facing the bottom wall. The first resilient cover 22 and second resilient cover 24 are formed for example of resilient bodies such as synthetic rubber.

Insulating means 30 is mounted on the external container 11 between the ends where the first resilient cover 22 and second resilient cover 24 are mounted. The insulating means 30 comprises a plurality of insulating members 32 and connecting members 34 that hold the plurality of insulating members 32. In this embodiment, the insulating members 32 are of substantially spherical shape.

The plurality of insulating members 32 are arranged in a separated fashion along the main wall 11a1. In this embodiment, the plurality of insulating members 32 are arranged in a matrix fashion at prescribed intervals in the height direction (Y direction) and width direction (X direction) of the external container 11. Specifically, the connecting members 34 comprise first connecting members extending in the Y direction and second connecting members extending in the X direction and Z direction, that surround the periphery of the external container 11; the insulating members 32 are arranged in the positions where the first connecting members and second connecting members intersect. In this embodiment, insulating means 30 are arranged located in positions such that the main wall 11a1 of the external containing 11 and the insulating members 32 face each other.

The insulating means 30 could be formed for example in tubular shape, or could be formed in sheet shape. In this embodiment, the insulating means 30 is capable of being extended or contracting, and is formed in tubular shape; the insulating means 30 is mounted on the container main body 11a utilizing the contracting force thereof.

When mounting the tubular insulating means 30 on the container main body 11a, the insulating means 30 is mounted by insertion of the container main body 11a in the tubular insulating means 30. When mounting sheet-shaped insulating means 30 on the container main body 11a, the insulating means 30 is mounted by coiling the insulating means 30 on the container main body 11a and connecting the ends thereof. When connecting one end with the other, connection may be effected by means of a separate, or an integral cord or the like, mounted at the end.

Also in the case where the insulating means 30 is formed of thermoplastic material, the insulating member 32 may be held by mounting the insulating means 30 by coiling onto the container main body 11a after application of heat, and deforming in accordance with the shape of the outer surface of the container main body 11a. It is also possible to join the ends of the insulating means 30 by placing one end on top of the other and applying heat and pressure.

Figure 3:
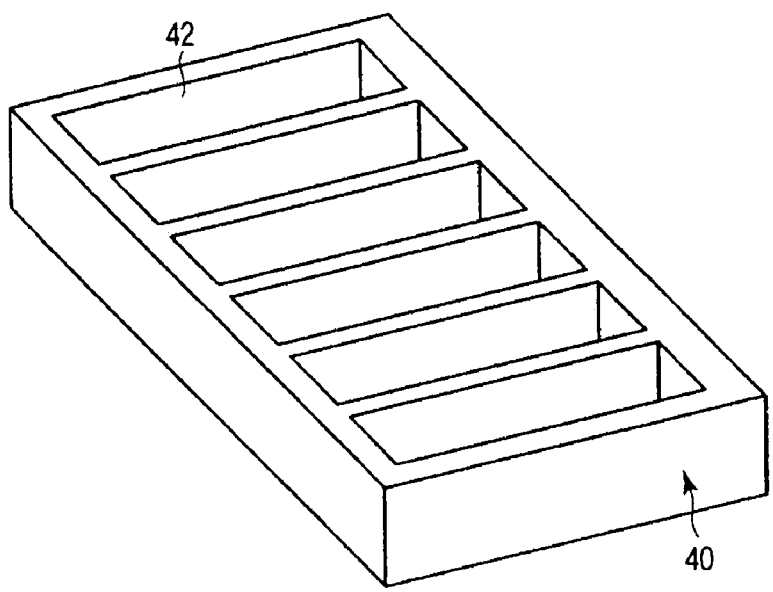
FIG. 3 is a perspective view given in explanation of a constructional example of the casing of a battery module according to an embodiment of the present invention.
Figure 4:
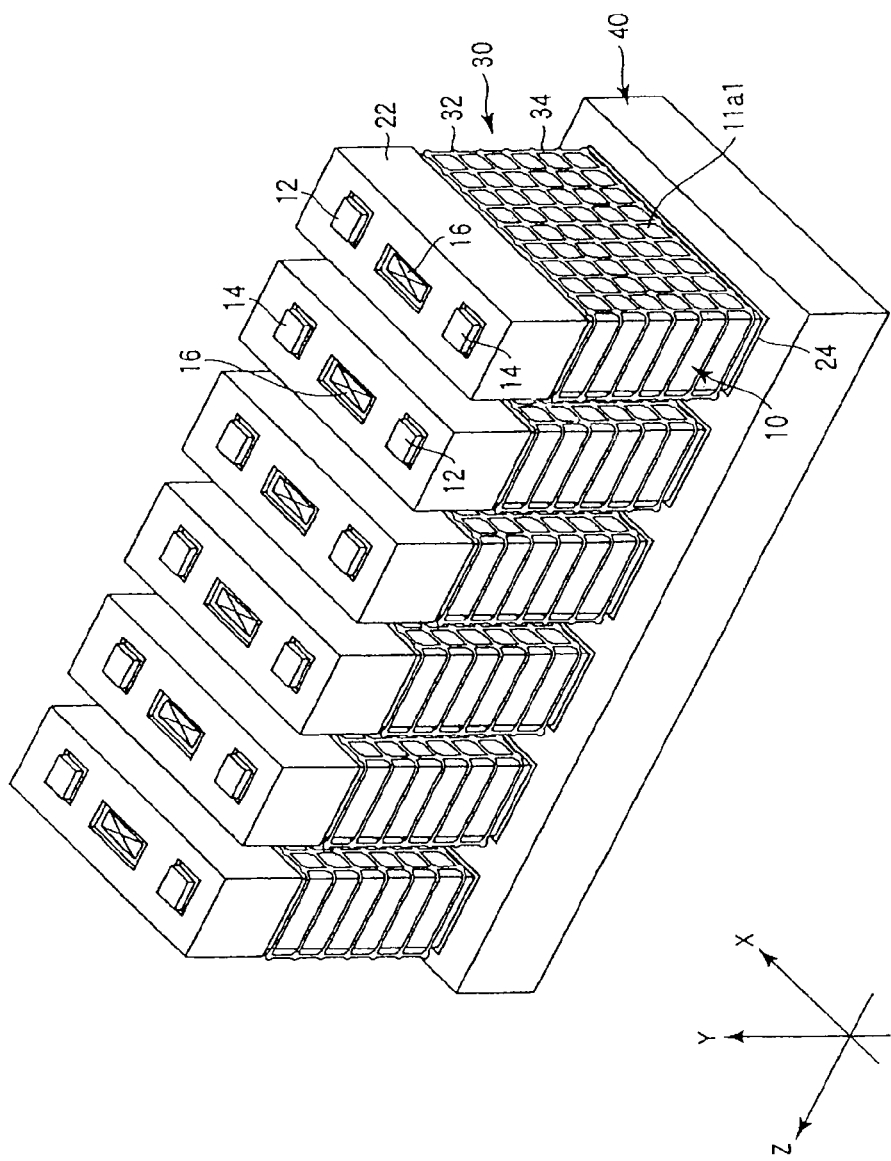
FIG. 4 is a perspective view given in explanation of a constructional example of the condition in which the battery cell shown in FIG. 2 is accommodated in the casing shown in FIG. 3.

After the battery cell 10 has had the resilient covers 22, 24 and insulating means 30 mounted thereon as shown in FIG. 2, one end thereof is held by a holding section 42 of the casing 40, as shown in FIG. 3. As shown in FIG. 4, the battery cells 10 are arranged lined up in the thickness direction thereof (Z direction), with the ends on which the second resilient covers 24 are mounted held by the holding section 42. Consequently, adjacent battery cells 10 are arranged lined up such that adjacent main walls 11a1 of the container main body 11a face each other.

The size of the holding section 42 is larger than the ends of the battery cells 10 in a condition in which no second resilient cover 24 is mounted and is smaller than the ends of the battery cells 10 in a condition in which a second resilient cover 24 is mounted.

Consequently, when the end of a battery cell 10 with a second resilient cover 24 mounted thereon is inserted into the holding section 42, the end of the battery cell 10 is held by the holding section 42 in a condition in which there is no gap between the second resilient cover 24 and the holding section 42.

In this condition, force is generated by the second resilient cover 24 in a direction pushing back from the second resilient cover 24 onto the holding section 42 so as to shrink the second resilient cover 24 so as to conform to the size of the holding section 42. By the generation of this force, the ends of the battery cell 10 are held by the holding section 42.

Figure 5:
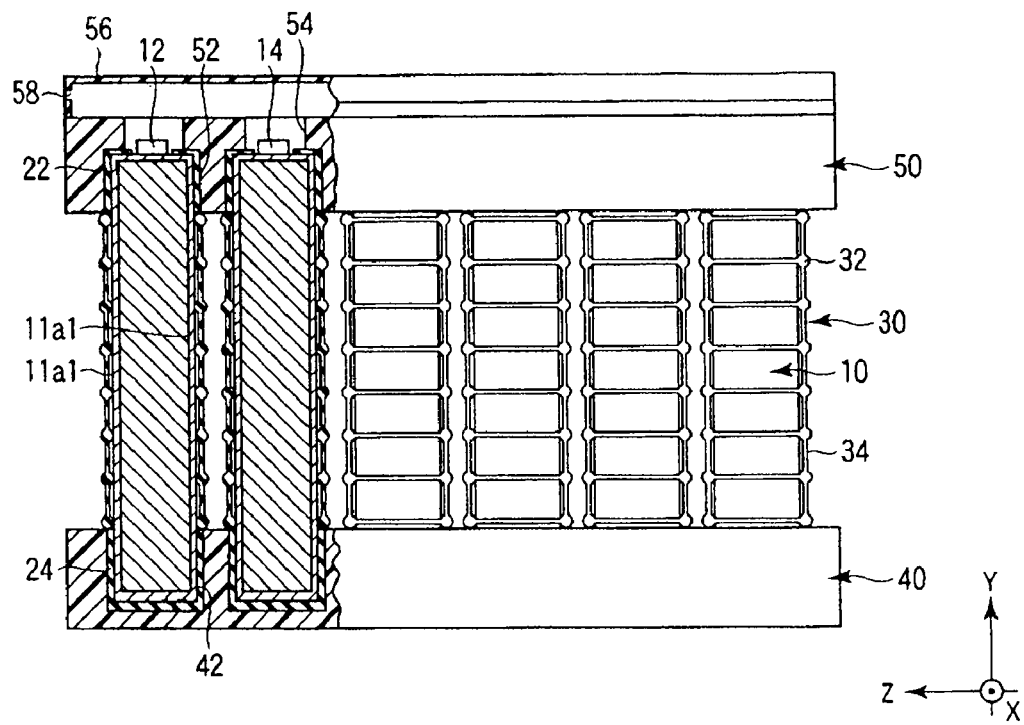
FIG. 5 is a cross-sectional view, with part broken away, given in explanation of a constructional example of a battery module according to an embodiment of the present invention.

As shown in FIG. 5, on the side of the end where the first resilient cover 22 is mounted, the battery cell 10 is held by the holding section 52 of the casing 50. The size of the holding section 52 is larger than the ends of the battery cells 10 in a condition in which no first resilient cover 22 is mounted and is smaller than the ends of the battery cells 10 in a condition in which a first resilient cover 22 is mounted.

Consequently, when the end of a battery cell 10 with a first resilient cover 22 mounted thereon is inserted into the holding section 52, the end of the battery cell 10 is held by the holding section 52 in a condition in which there is no gap between the first resilient cover 22 and the holding section 52.

In this condition, when the end of a battery cell 10 with a first resilient cover 22 mounted thereon is inserted into the holding section 52, force is generated in a direction pushing back from the first resilient cover 22 onto the holding section 52. By this force, the ends of the battery cell 10 are held by the holding section 52.

On the casing 50, there is provided an aperture 54 that exposes the positive electrode terminal 12 and negative electrode terminal 14 of the battery cell 10. The casing 50 has a gas discharge mechanism. The gas discharge mechanism comprises a gas collecting section 56 that forms a space covering the pressure release valve 16 of the battery cells 10 and a gas discharge aperture 58 that is provided in the gas collecting section 56. The gas collecting section 56 extends in the direction (Z direction) in which the battery cells 10 are arranged and is provided with a gas discharge aperture 58 at its end in the Z direction.

When gas is generated within a battery cell 10 and the gas is discharged by opening of the pressure release valve 16, the gas that is discharged is released into the space within the gas collecting section 56 and is released to the outside from the gas discharge aperture 58 provided at the end of the gas collecting section 56.

FIG. 5 is a partially broken-away cross-sectional view of a plurality of battery cells arranged in a row. As shown in this Figure, if the battery module is constructed by arrangement of a plurality of battery cells 10 in a row, with adjacent main walls 11a1 of the container main bodies 11a facing each other, with the insulating members 32 being held by mounting of the insulating means 30 on the battery cells 10 in such a way that the insulating members 32 are arranged so as to face the main walls 11a1 of the container main bodies 11a, it is possible to ensure that no contact can take place between the external containers 11, even if the external containers 11 swell up.

Specifically, even when the external containers 11 swell up in the Z direction, the insulating members 32 are held between the adjacent main walls 11a1 of the external containers 11, so there is no possibility of adjacent main walls 11a1 coming into contact.

Furthermore, the insulating members 32 are arranged with a prescribed separation and are not fixed to the surface of the external containers 11, so it is possible for the surface of the external containers 11 to come directly into contact with the coolant, so there is no possibility that cooling of the battery cells 10 by the coolant will be impeded by the insulating means 30.

Specifically, with a battery module according to the present embodiment, a battery module can be provided that achieves insulation between the battery cells without impeding cooling of the battery cells.

It should be noted that the present invention is not restricted to the above embodiment, and could be realized by modifying various structural elements, at the stage of implementation, without departing from its gist. For example, the insulating members 32 of the insulating means 30b and the connecting members 34 could be integrally formed of the same material, or could be formed of different materials. Regarding the insulating members 32, for example an insulating member 32 and connection member 34 could be integrally formed by resilient bodies made of for example synthetic rubber, or insulating members 32 in the form of resin beads could be performed connected by resilient bodies made of synthetic resin or the like.

Furthermore, although, in the case of the battery module according to the above embodiment, connecting members 34 were arranged in a grid fashion, with insulating members 32 arranged at the intersections of the connecting members 34, the present invention is not restricted to this arrangement and a construction could be adopted, within the scope of the present invention, wherein the insulating members 32 are held in a mutually separated fashion between the main walls 11a1 of the container main bodies 11a.

Figure 6:
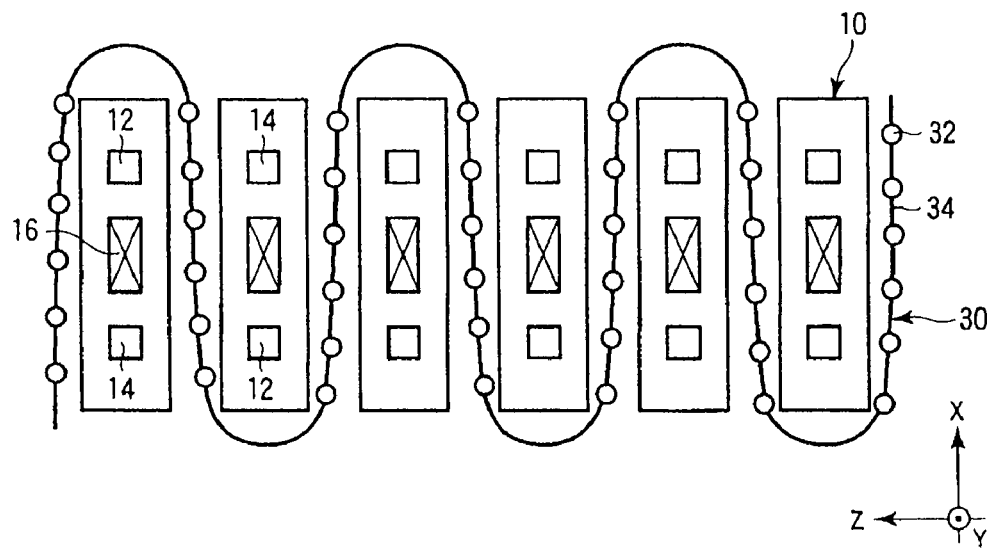
FIG. 6 is a plan view given in explanation of another constructional example of insulating means in a battery module according to the present invention.

For example, FIG. 6 is a plan view showing a plurality of battery cells lined up in a row; as shown in this Figure, insulating members 32 could be arranged between the main walls 11a1 of the container main bodies 11a by arranging insulating means 30 formed in the shape of sheets threaded between battery cells 10 arranged in a row. Specifically, in the case shown in FIG. 6, the insulating means 30 is arranged along the side wall on one side of a given battery cell 10, and is arranged along the side wall on the other side of an adjacent battery cell 10, passing between the main walls of this battery cell 10 and the adjacent battery cell 10.

Figure 7:
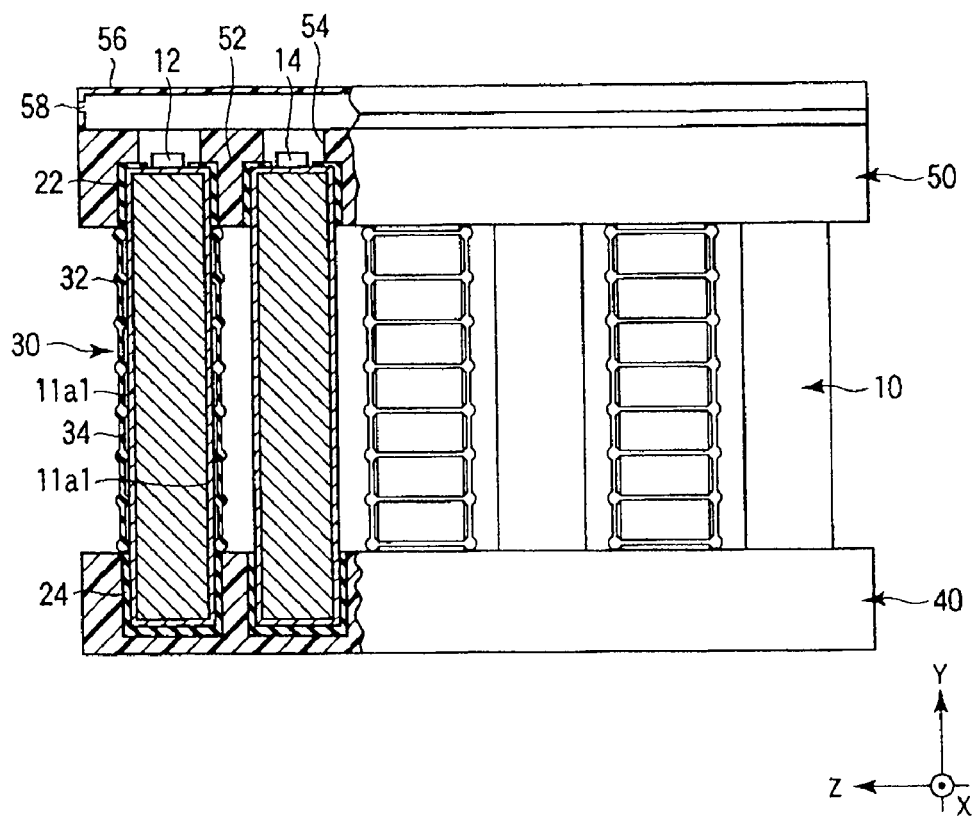
FIG. 7 is a cross-sectional view, with part broken away, given in explanation of another constructional example of a battery module according to an embodiment of the present invention.

Also, although, in the case of the battery module according to the embodiment described above, the insulating means 30 was mounted on all of the battery cells 10 arranged in a row in the thickness direction (Z direction), as shown in FIG. 7, it would be possible to adopt an arrangement in which one or more battery cells 10 with insulating means 30 mounted thereon are arranged between battery cells 10 with no insulating means 30 mounted thereon.

For example, as shown in FIG. 7, if insulating means 30 is mounted on alternate battery cells 10 arranged in the Z direction, an insulating member 32 will always be held between the main walls 11a1 of adjacent container main bodies. Consequently, an arrangement wherein one or more battery cells 10 with insulating means 30 mounted thereon is arranged between battery cells 10 where no insulating means 30 is mounted, as shown in FIG. 7, is also within the scope of the present invention.

Also, although, in the above embodiment, the insulating members 32 were of substantially spherical shape, the insulating members 32 could be of different shape. The insulating members 32 could be for example polyhedral bodies.

It should be noted that, although, in the above embodiments, the insulating members 32 were arranged so as to face the main walls 11a1 of the container main bodies 11a, if the battery cells 10 are arranged so that adjacent side faces thereof are facing, contact between adjacent side faces can be further prevented by arranging insulating members 32 between the side walls and side faces of the container main bodies 11a. That is, side-by-side arrangement of the battery cells, in which the insulating members are arranged in a separated fashion between opposite wall faces of adjacent battery cells, is included in the scope of the present invention.

Also, various inventions can be formed by suitable combination of the various constituent elements disclosed in the above embodiments. For example, some structural elements could also be omitted from the structural elements shown in the embodiments. Furthermore, structural elements may be suitably combined between different embodiments.

What is claimed is:
1. A battery module comprising:
a plurality of battery cells with substantially rectangular parallelepiped shape;
a first casing having a first holding section that holds one end of said plurality of battery cells;
a second casing having a second holding section that holds the other end of said plurality of battery cells;
and a plurality of insulating members arranged between said battery cells,
wherein said battery cells are arranged lined up so that adjacent main walls thereof extending between said one ends and said other ends face each other and said plurality of insulating members are arranged in a mutually separated fashion between said main walls.

2. The battery module according to claim 1, wherein said insulating members are joined by connecting members.

3. The battery module according to claim 1, further comprising:
a first resilient cover mounted on one end of said battery cells; and
a second resilient cover mounted on the other end of said battery cells,
wherein one end of said battery cells is held by said first holding section by means of said first resilient cover; and
the other end of said battery cells is held by said second holding section by means of said second resilient cover.

4. The battery module according to claim 2,
wherein said connecting members have a plurality of first connecting members extending in a first direction arranged in a mutually separated fashion, and a plurality of second connecting members extending in a second direction orthogonal to said first direction arranged in a mutually separated fashion; and
said insulating members are arranged in positions at which said plurality of first connecting members and said plurality of second connecting members intersect.

5. The battery module according to claim 2 or claim 4, wherein said battery cells comprise:
first battery cells wherein said plurality of insulating members are held so as to face said main walls, by said connecting members arranged so as to surround the periphery, in the region between said one end and said other end; and
second battery cells whereon said insulating members are not mounted,
wherein one or more said first cells are arranged between said second battery cells.

6. The battery module according to claim 2 or claim 4, wherein said connection members are arranged so as to be threaded between said battery cells arranged in a row.

7. The battery module according to claim 2 or claim 4, further comprising:
a first resilient cover mounted at one end of said battery cells; and
a second resilient cover mounted at the other end of said battery cells,
wherein one end of said battery cells is held by said first holding section by means of said first resilient cover; and
the other end of said battery cells is held by said second holding section by means of said second resilient cover.

8. The battery module according to claim 5,
further comprising:
a first resilient cover mounted at one end of said battery cells; and
a second resilient cover mounted at the other end of said battery cells,
wherein one end of said battery cells is held by said first holding section by means of said first resilient cover; and
the other end of said battery cells is held by said second holding section by means of said second resilient cover.

9. The battery module according to claim 6,
further comprising:
a first resilient cover mounted at one end of said battery cells; and
a second resilient cover mounted at the other end of said battery cells,
wherein one end of said battery cells is held by said first holding section by means of said first resilient cover; and
the other end of said battery cells is held by said second holding section by means of said second resilient cover.

* * * * *